United States Patent
Kanazawa et al.

(10) Patent No.: US 9,249,511 B2
(45) Date of Patent: Feb. 2, 2016

(54) METHOD FOR REGENERATING PLATING SOLUTION

(71) Applicant: FUJI SHOJI CO., LTD., Hashima-shi (JP)

(72) Inventors: Nobuhiro Kanazawa, Hashima (JP); Katsuhiro Goto, Hashima (JP); Tatsuya Banno, Hashima (JP)

(73) Assignee: FUJI SHOJI CO., LTD., Hashima-shi (JP)

( * ) Notice: Subject to any disclaimer, the term of this patent is extended or adjusted under 35 U.S.C. 154(b) by 0 days.

(21) Appl. No.: 14/759,699

(22) PCT Filed: Feb. 5, 2013

(86) PCT No.: PCT/JP2013/052606
§ 371 (c)(1),
(2) Date: Jul. 8, 2015

(87) PCT Pub. No.: WO2014/122726
PCT Pub. Date: Aug. 14, 2014

(65) Prior Publication Data
US 2015/0345024 A1 Dec. 3, 2015

(51) Int. Cl.
| | | |
|---|---|---|
| *C23C 18/31* | (2006.01) | |
| *C23C 18/32* | (2006.01) | |
| *C23C 18/38* | (2006.01) | |
| *C23C 18/54* | (2006.01) | |
| *C25D 21/16* | (2006.01) | |
| *C25D 21/18* | (2006.01) | |
| *C02F 1/54* | (2006.01) | |
| *C02F 1/64* | (2006.01) | |
| *C02F 1/72* | (2006.01) | |
| *C02F 1/78* | (2006.01) | |
| *C23C 18/16* | (2006.01) | |
| *C02F 1/52* | (2006.01) | |
| *C02F 101/20* | (2006.01) | |
| *C02F 103/16* | (2006.01) | |

(52) U.S. Cl.
CPC ........... *C23C 18/1617* (2013.01); *C02F 1/5272* (2013.01); *C02F 1/542* (2013.01); *C02F 1/64* (2013.01); *C02F 1/722* (2013.01); *C02F 1/78* (2013.01); *C02F 2101/203* (2013.01); *C02F 2103/16* (2013.01); *C23C 18/31* (2013.01); *C25D 21/18* (2013.01)

(58) Field of Classification Search
CPC C23C 18/1617; C23C 18/1689; C23C 18/31; C23C 18/32; C23C 18/38; C23C 18/54; C25D 21/16; C25D 21/18; C02F 1/5272; C02F 1/64; C02F 1/542; C02F 1/722; C02F 1/78; C02F 2101/203; C02F 2103/16
USPC ........... 106/1.22, 1.23, 1.25, 1.26, 1.27, 1.29; 210/702, 722, 729, 759, 760; 205/99
See application file for complete search history.

(56) References Cited

U.S. PATENT DOCUMENTS

| | | | | |
|---|---|---|---|---|
| 5,451,323 | A * | 9/1995 | Akao | ................ C25D 21/22 205/99 |
| 8,202,431 | B2 * | 6/2012 | Werner | .............. C23C 18/1617 205/99 |
| 2012/0104331 | A1 * | 5/2012 | Kolics | .................... C23C 18/31 106/1.22 |
| 2014/0158544 | A1 * | 6/2014 | Ou | ...................... C23C 18/1617 205/99 |
| 2015/0037512 | A1 * | 2/2015 | Banno | ................ C23C 18/1617 427/532 |

FOREIGN PATENT DOCUMENTS

| | | |
|---|---|---|
| JP | 07 003500 | 1/1995 |
| JP | 2005 224670 | 8/2005 |

OTHER PUBLICATIONS

English translation of JP 2005/224670; Aug. 2005; 20 pages.*
International Search Report Issued Mar. 12, 2013 in PCT/JP2013/052606 Filed Feb. 5, 2013.

* cited by examiner

*Primary Examiner* — Helene Klemanski
(74) *Attorney, Agent, or Firm* — Oblon, McClelland, Maier & Neustadt, L.L.P.

(57) ABSTRACT

The problem addressed by the present invention is to provide a method for facilitating the regenerating a waste plating solution as a plating solution. This method for regenerating an acidic waste plating solution containing, as ions, Fe and at least one plating metal element selected from the group consisting of Cu, Ni, Zn, Co, and Mn by removing Fe therefrom is characterized in having an addition step in which phytic acid is added to the waste plating solution to yield a phytic-acid-containing solution in which Fe ions are precipitated, and a removal step in which the precipitate is removed from the phytic-acid-containing solution to yield a regenerated plating solution.

7 Claims, No Drawings

METHOD FOR REGENERATING PLATING SOLUTION

TECHNICAL FIELD

The present invention relates to a method for regenerating a waste plating solution produced after applying plating such as copper plating or bronze plating to iron and steel and the like as a new plating solution.

BACKGROUND ART

One of methods for applying copper plating or bronze plating to iron and steel is immersion plating involving immersion of a member to be plated in a plating solution containing copper sulfate or containing copper sulfate and stannous sulfate. This immersion plating utilizes a difference in ionization tendency between iron and copper or tin, and iron is dissolved, in an amount depending on the amount of the plating copper or bronze, in a waste plating solution.

Since the waste plating solution contains cations such as Cu ions and Fe ions and anions such as sulfate ions, it was neutralized and then an aggregating agent was added thereto to aggregate the cations for recovery of the metals so that a clean waste solution was drained.

As a method for recovering metals from a waste plating solution, there is disclosed a method comprising passing a waste tin plating solution containing Fe ions and Sn ions through a strongly acidic cation-exchange resin to adsorb and recover cations onto the cation-exchange resin, and then passing an acid solution through the cation-exchange resin on which the cations are adsorbed to recover the cations in the acid, thereby precipitating and separating Sn (Patent Document 1).

PRIOR ART DOCUMENT

Patent Document
Patent Document 1: JP H7-3500 A (See Claims etc.)

SUMMARY OF THE INVENTION

Problems to be Solved by the Invention

However, a strongly acidic waste plating solution must be once neutralized in order to adsorb cations onto a cation-exchange resin in the methods disclosed in Patent Document 1 and the like. Besides, a strong acid is required for subsequent recovery of cations from a strongly acidic cation-exchange resin, and chemicals must be added from the external, for example, caustic soda must be added for precipitation of cations. Thus, the methods require much labor for recovery and disposal of the added chemicals. Also, a chemical is required for neutralization.

Methods comprising adding an aggregating agent have required neutralization of a waste plating solution before regeneration since there is no aggregating agent which can sufficiently exhibit the aggregating effect at a pH (about pH 1) of the waste plating solution.

The present invention has been completed in light of the above-described actual situation, and the problem addressed thereby is to provide a simple method for the regenerating a waste plating solution as a plating solution.

Solutions to the Problems (1) The method for regenerating a plating solution, according to the present invention which solves the above-described problems, by removing Fe from an acidic waste plating solution containing as ions Fe and at least one plating metal element selected from the group consisting of Cu, Ni, Zn, Co, and Mn is characterized by having:

an addition step in which phytic acid is added to the waste plating solution to yield a phytic-acid-containing solution in which Fe ions are precipitated; and a removal step in which the precipitate is removed from the phytic-acid-containing solution to yield a regenerated plating solution.

Phytic acid can chelate and insolubilize Fe ions even in a strongly acidic atmosphere. Since Fe is preferentially chelated as compared with Cu, Ni, Zn, Co and Mn, Fe alone can be selectively removed while useful Cu, Ni, Zn, Co and Mn remain. Since Fe ions can be removed while the atmosphere remains strongly acidic, no chemical must be added for neutralization or the like. Therefore, unnecessary components would not be accumulated, and, as a result, the regenerated plating solution after removal of Fe can be recycled as a plating solution as it is or by adding ions of necessary metals (Cu, Ni, Zn, Co and Mn).

In other words, Fe ions can also be removed without substantially adding chemicals other than phytic acid if necessary, and thus the mixing of chemicals unnecessary for plating in the regenerated plating solution after the removal can also be minimized. As a result, the recycle of the regenerated plating solution is facilitated.

The above-described method (1) for regenerating a plating solution can be combined with at least one of the following (2) to (4).

(2) The method has an oxidation step in which divalent Fe ions are oxidized into trivalent Fe ions, prior to the above-described addition step. Since trivalent Fe ions are more easily chelated by phytic acid than divalent Fe ions, it is desirable to oxidize Fe ions into trivalent Fe ions and then to add phytic acid in order to ensure removal of Fe ions. The method for oxidizing Fe ions into trivalent Fe ions is not particularly limited, and oxidization is desirably carried out by adding an oxidant. Examples of desirable oxidants include $H_2O_2$ and $O_3$ (especially, $H_2O_2$). $H_2O_2$ and $O_3$, advantageously, less adversely affect plating reactions both when reacted (which become water and the like) and when not reacted and remaining (which can be easily converted into water and the like).

(3) The above-described plating metal element contains at least copper. The plating solution containing copper includes copper plating (only copper) and bronze plating (copper and tin).

(4) The above-described waste plating solution has a pH of 2 or less. Since the metal ions subjected to plating are used together with a strong acid such as a sulfate, the waste plating solution is also strongly acidic. If the waste plating solution can be treated as it is, no labor for treatment would be required, and the recycle of the regenerated plating solution would also be facilitated.

Effect of the Invention

The method for regenerating a waste plating solution according to the present invention has the above-described configuration, and thus can be used to easily remove Fe ions from a waste plating solution containing a plurality of metal ions.

EMBODIMENTS OF THE INVENTION

An embodiment of the method for regenerating a plating solution according to the present invention is explained in detail below. The method for regenerating a plating solution according to the present embodiment is a method for regenerating a waste plating solution produced after applying copper plating (immersion plating) to a member to be plated as a plating solution which can be used for plating again. The member to be plated is formed of a metal (iron and steel) including iron as a main component. The plating solution contains Cu ions, and sulfate ions as counter ions. Also, ions of elements such as Sn (elements nobler than Fe) can also be incorporated together with Cu ions. The member to be plated is plated with Sn together with Cu (bronze plating). The plating method and plating device according to the present embodiment are implemented using this plating solution. Also for waste plating solutions obtained from plating solutions containing Ni, Zn, Co, and Mn in addition to Cu ions, Fe ions can be removed through similar operations. The waste plating solution and plating solution used when immersion plating is carried out are explained in the present embodiment, but the present embodiment can be applied to a method for regenerating a plating solution in a plating method referred to as so-called electroless plating. Also during electroless plating, a reaction which is similar to that in immersion plating proceeds, for example, at the early plating stage, resulting in dissolution of the member to be plated (iron) in the waste plating solution. Therefore, there is a demand for removal of the dissolved iron ions. That is, the plating to which this regenerating method is applied is such that iron ions are dissolved in the waste plating solution.

The method for regenerating a plating solution according to the present embodiment comprises adding phytic acid (myo-inositol-1,2,3,4,5,6-hexaphosphate) (addition step) to chelate Fe ions contained in a waste plating solution, thereby separating the Fe ions, in order to regenerate a plating solution from the waste plating solution. The Fe ions chelated by phytic acid can be separated for insolubilization (removal step). Examples of specific separation methods include ordinary methods such as filtration and precipitation (for example, spontaneous precipitation and centrifugation).

Since the chelate reaction by phytic acid rapidly proceeds, the precipitate can be removed immediately after addition of phytic acid. While the separated Fe ions chelated by phytic acid contain moisture, the separated liquid is utilized for regeneration as it is, and a step of separating moisture contained in the separated precipitate can be provided. An aggregating agent can be added to the precipitate to reduce the amount of moisture (and metal ions used in plating) contained in the precipitate chelated by phytic acid.

The amount of phytic acid to be added can be determined according to the amount of the Fe ions contained in the waste plating solution. The amount of phytic acid is determined according to the amount of Fe ions which may be contained in the regenerated plating solution. For example, when Fe ions may remain a little, phytic acid is added in an amount which is equal to or slightly smaller than the amount of Fe ions. When one desires to surely remove Fe ions, an excessive amount of phytic acid is added. The measurement of the Fe ion amount can employ measurement of Fe ion amount (such as ICP emission spectrometry, ICP-MS analysis and colorimetric analysis), a theoretical value (calculated from the thickness of plating, the surface area of the member to be plated and the like; calculated from the mass change between before and after plating of the member to be plated and the like) and an experience value (estimated according to the plated member).

The Fe ions contained in the waste plating solution are desirably oxidized into trivalent Fe ions so as to be easily chelated by phytic acid. The method for oxidizing Fe ions into trivalent Fe ions is desirably carried out by addition of hydrogen peroxide. While the amount of an oxidant to be added is not particularly limited, the oxidant can be added according to the amount of Fe ions, or can be added in an excessive amount when slightly or not adversely affecting metal ions other than Fe ions.

The regenerated plating solution from which Fe ions have been removed is used as it is, or necessary amounts of metal ions (copper ions in copper plating, copper and tin ions in bronze plating, and corresponding metal ions in other plating) are added thereto. The addition of metal ions can be carried out by using some salt (for example, sulfate).

It is not especially necessary to control the pH of the waste plating solution, and strongly acidic waste plating solutions having, for example, a pH of 1 can be treated as they are.

EXAMPLES

Test 1

One hundred (100) liter of a waste plating solution was treated with phytic acid to yield 65 L of a regenerated plating solution. The waste plating solution before treatment contained tin, copper and iron at concentrations of 0.44 g/L, 5.65 g/L and 8.67 g/L, respectively.

To this waste plating solution, 35% hydrogen peroxide water (1502.6 g: 1508.6 g as a calculated value corresponding to the iron contained) was added, and they were stirred and mixed. Thereafter, a 50% aqueous phytic acid solution was added in an amount slightly smaller than the calculated value (theoretical value) (5376.0 g: 5635.5 g as a calculated value corresponding to the iron contained), and then separation was carried out by filtration.

As a result, the obtained regenerated plating solution contained tin, copper and iron at concentrations of 0 g/L, 5.42 g/L and 1.87 g/L, respectively.

From this result, it has been clearly found that the addition of phytic acid in an amount smaller than the theoretical value slightly reduces the content of copper, and that iron is preferentially removed. However, phytic acid was added in an amount smaller than the theoretical value, and thus iron remained in the regenerated plating solution.

The concentrations of metals other than copper, tin and iron before and after the application of this regenerating method were measured. Specifically, the concentrations of boron, sodium, phosphorus, potassium, and calcium changed from 3.29 mg/L to 0.87 mg/L, from 9.03 mg/L to 34.34 mg/L, from 4250.46 mg/L to 4118.99 mg/L, from 1.78 mg/L to 11.78 mg/L, and from 27.94 mg/L to 287.71 mg/L, respectively.

Test 2

The plating solution regenerated by the method corresponding to Test 1 was subjected to plating, and 75 L of the obtained waste plating solution was treated with phytic acid to yield 50 L of a regenerated plating solution. The waste plating solution before treatment contained tin, copper and iron at concentrations of 0.44 g/L, 5.26 g/L and 10.98 g/L, respectively.

To this waste plating solution, 35% hydrogen peroxide water (1713.2 g: 1432.9 g as a calculated value corresponding to the iron contained) was added, and they were stirred and mixed. Thereafter, a 50% aqueous phytic acid solution was added in an amount slightly larger than the calculated value (theoretical value) (5565.8 g: 5352.75 g as a calculated value corresponding to the iron contained), and then separation was carried out by filtration.

As a result, the obtained regenerated plating solution contained tin, copper and iron at concentrations of 0 g/L, 4.11 g/L and 0.17 g/L, respectively.

From this result, it has been clearly found that the addition of phytic acid in an amount larger than the theoretical value slightly reduces the content of copper, but that iron is almost removed. It has also been found that the other analyzed components were slightly changed, and that no unnecessary components would be accumulated even after the regenerating method of the present invention is repeatedly carried out.

The concentrations of metals other than copper, tin and iron before and after the application of this regenerating method were measured. Specifically, the concentrations of boron, sodium, phosphorus, potassium, and calcium changed from 9.06 mg/L to 2.52 mg/L, from 50.32 mg/L to 73.52 mg/L, from 4053.08 mg/L to 2982.26 mg/L, from 11.82 mg/L to 16.46 mg/L, and from 270.21 mg/L to 202.84 mg/L, respectively. As a result of comparison with the changes of the concentrations of these metals in Test 1, it has found that the metal having increased one-sidedly is only sodium, and that sodium, when contained at such a concentration, also hardly affects plating.

Test 3

Phytic acid was replaced with EDTA, citric acid or DTPA for testing. The chelated Fe ions were dissolved as they were, and were difficult to be separated by a solid-liquid separation method such as filtration. In a strongly acidic atmosphere, Fe ions are chelated but rapidly separated, and thus cannot develop the chelating ability. Thus, the complexing of Fe ions was per se difficult.

(Consideration)

As is evident from the results of Tests 1 to 3, it has been found that the regeneration of a plating solution from a waste plating solution can be repeatedly carried out. The reduced metals such as copper could be added as sulfates to be recycled for plating as they were.

INDUSTRIAL APPLICABILITY

The method for regenerating a waste plating solution according to the present invention has the above-described configuration, and thus can be used to easily remove Fe ions from a waste plating solution containing a plurality of metal ions.

The invention claimed is:

1. A method for regenerating a plating solution by removing Fe from an acidic waste plating solution containing, as ions, Fe and at least one plating metal element selected from the group consisting of Cu, Ni, Zn, Co, and Mn, the method comprising:
   adding phytic acid to the waste plating solution to yield a phytic-acid-containing solution in which Fe ions are precipitated; and
   removing the precipitate from the phytic-acid-containing solution to yield a regenerated plating solution.

2. The method for regenerating a plating solution according to claim 1, comprising oxidizing divalent Fe ions into trivalent Fe ions, prior to said adding.

3. The method for regenerating a plating solution according to claim 1, wherein the plating metal element contains at least copper.

4. The method for regenerating a plating solution according to claim 2, wherein the waste plating solution has a pH of 2 or less.

5. The method for regenerating a plating solution according to claim 2, wherein the plating metal element contains at least copper.

6. The method for regenerating a plating solution according to claim 1, wherein the waste plating solution has a pH of 2 or less.

7. The method for regenerating a plating solution according to claim 3, wherein the waste plating solution has a pH of 2 or less.

* * * * *